May 12, 1925.
A. B. CASE
LAWN MOWER
Filed Sept. 28, 1921
1,537,917
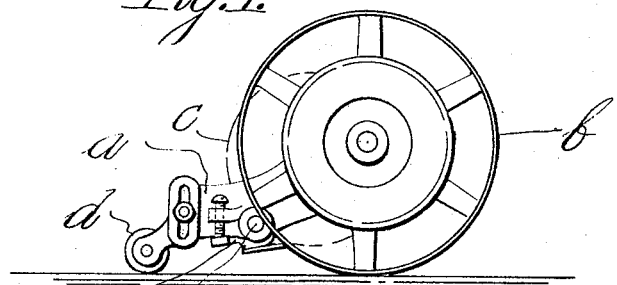
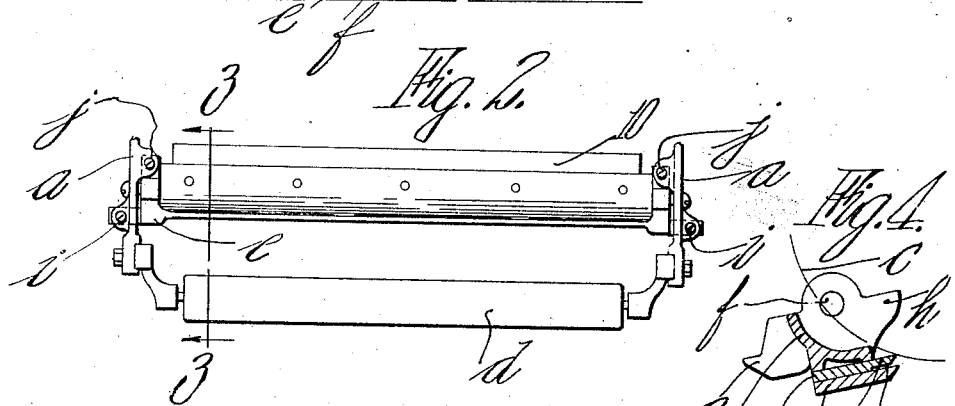
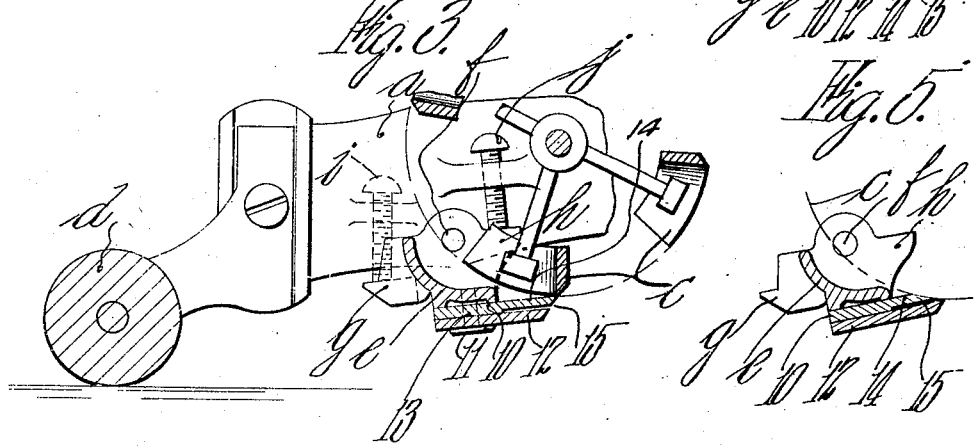
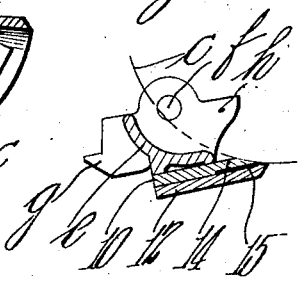
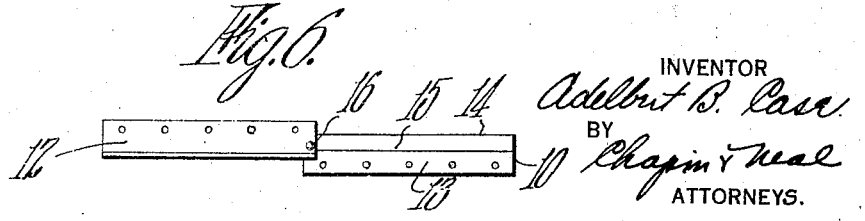
INVENTOR
Adelbert B. Case
BY
Chapin & Neal
ATTORNEYS.

Patented May 12, 1925.

1,537,917

UNITED STATES PATENT OFFICE.

ADELBERT B. CASE, OF SPRINGFIELD, MASSACHUSETTS; UNION TRUST COMPANY, ADMINISTRATOR OF SAID ADELBERT B. CASE, DECEASED, ASSIGNOR TO BLAIR MANUFACTURING COMPANY, A CORPORATION OF MASSACHUSETTS.

LAWN MOWER.

Application filed September 28, 1921. Serial No. 503,733.

*To all whom it may concern:*

Be it known that I, ADELBERT B. CASE, a citizen of the United States, residing at Springfield, in the county of Hampden and State of Massachusetts, have invented new and useful Improvements in Lawn Mowers, of which the following is a specification.

This invention relates to lawn mowers and more particularly to improvements in the cutting knives thereof.

The usual cutting knife is rigidly mounted on the mower frame and is also rigid under all usual operating conditions. A knife of this type must therefore be adjusted with close accuracy to the revolving spiral blades in order to shear perfectly from end to end and this adjustment has to be made by an expert because the work must be done within very close limits and be practically perfect.

Attempts have heretofore been made to avoid the necessity for such precise adjustment and to provide a cutting knife which could readily be adjusted to the revolving spiral blades by the relatively unskilled. The cutting knife has been made flexible and designed to yield when engaged by the spiral blades. Such a knife, even if set too closely into the path of the revolving spiral blades, could yield when required and still perform its function. Consequently, precise setting of the blades was not required and adjustments might be made even by the amateur.

Flexible cutting knives, of the type alluded to, have, however, been abandoned as a practical proposition, so far as I am aware. These knives, although advantageous in that they could yield to compensate for inaccuracies in adjustment, had a marked disadvantage in that the yielding was not controlled and frequently occurred when not desired. For example, the flexible knife might work properly on short and relatively tender grass, but, when heavy or tough grass was encountered, the knife would yield rather than cut.

This invention is concerned with, and has for an object, the provision of a cutting knife, which can yield sufficiently to permit the desirable advantage, heretofore outlined, to be obtained but is prevented from yielding beyond fixed limits so as to overcome the disadvantage incident to the use of prior flexible knives. In other words, the yielding of the knife is controlled and, by this controlling of the yielding, a knife, hitherto unsatisfactory as a practical matter but possessing a most desirable advantage, has been rendered suitable for commercial use.

More particularly, the invention has for an object to provide a cutting knife, which is in itself sufficiently flexible to compensate for inaccuracies of its adjustment in relation to the revolving spiral blades, together with a member forming a stop, against which the knife will abut after it has yielded to a predetermined degree.

Preferably, although not necessarily according to all features of the invention, the member, which functions as a stop, takes the form of a second cutting knife disposed below the flexible knife and arranged to come into play after the flexible knife has become worn down by extended use. Thus, a twin edge cutting knife is provided, in addition to the feature of controlled flexibility, to prolong the useful life of the knife.

According to another feature of the invention, the twin cutting knife described may be arranged for reversal, if desired, so that either knife may be used in the manner outlined.

Other features and advantages will appear in the following description and in the illustrative embodiment of the invention in the accompanying drawings, in which—

Fig. 1 is a side elevational view of a lawn mower embodying the invention;

Fig. 2 is a fragmentary top-plan view thereof;

Fig. 3 is an enlarged cross-sectional view taken on the line 3—3 of Fig. 2;

Fig. 4 is a fragmentary sectional view showing a different arrangement of the twin cutting edges relative to one another;

Fig. 5 is a view taken similarly to Fig. 4, showing the second cutting edge brought into play; and Fig. 6 is a bottom plan view of the cutting knife showing the manner of fastening the two knives together to permit one to be swung relatively to the other to expose the edges of both for grinding or other purposes.

Referring to these drawings: The lawn mower may be of any suitable type and construction and, as an illustrative example of one suitable type, there is shown a mower of the general kind disclosed in my prior U. S. Letters Patent No. 960,503, granted June 7, 1910. For the present purposes, it will suffice to state that $a$ indicates the usual spaced side plates, $b$ the traction wheels, $c$ the revoluble spiral blades driven therefrom (as in the manner shown in the patent above referred to), and $d$ the trailing roller. The bar for supporting the stationary knife is indicated at $e$ and may be mounted for adjustment relatively to the revoluble spiral blades $c$ in any suitable manner. As shown, bar $e$ is pivotally supported at its ends from the side plates $a$, the pivotal connection being designated $f$. Lugs $g$ and $h$ are provided at each end of bar $e$ which are designed to be engaged by screws $i$ and $j$, respectively, threaded into lugs located on the outer and inner sides, respectively, of the side plates $a$. By loosening screws $j$ and tightening screws $i$, bar $e$ may be swung toward the revoluble spiral blades $c$ and by reversing this operation the bar may be swung away from blades $c$.

The lawn mower, thus far described, is of a usual well-known construction too well understood in the art to require further description here. The particular type of mower illustrated and described is not important and various other types may be used as desired inasmuch as the invention is independent of the constructional details of the mower, and the one type shown has been given merely by way of illustrative example.

This invention is concerned primarily with the cutting knife itself, the characteristic feature of which is that the material used, the gage or thickness of such material and the distance between the cutting edge and the point constituting the fulcrum, are all designed to give a certain amount of flexibility to permit the described yielding action. Such a knife is shown at 10 in the drawings and may be made up of suitable material, such as steel, of proper gage and width. This knife is suitably and rigidly secured to bar $e$, as by screws 11, and is adjusted with relation to the spiral blades $c$ by means of screws $i$ and $j$ in the manner already described.

Below knife 10 and suitably secured in stationary relation with bar $e$ is a member 12, which forms a stop to limit or control the yielding of knife 10. This member 12 is spaced from knife 10, or the effective flexible portion thereof in any suitable manner, preferably by a portion 13, which may be integral with either member 10 or 12. As shown, this portion 13 is formed as an integral portion of knife 10 by recessing the latter for a portion of its width under the effective flexible portion 14 of the knife, such recessing being indicated at 15. The essential function of this recessing is merely to produce a means of spacing the flexible portion 14 of knife 10 from the member 12 and the degree of such spacing, of course, limits the amount of the yielding movement of the flexible knife. This knife is thus allowed to yield up to a certain point, viz., until it abuts the stop member 12, and thereafter the knife is backed up and reenforced by the stop member and becomes rigid, or substantially so, or at any rate far less readily yieldable.

The degree of flexibility of the knife will naturally vary somewhat according to the particular conditions encountered and is best arrived at by experimentation. To vary the degree of flexibility of knife 10, the thickness of the portion 14, or the distance between its cutting edge and fulcrum (the latter being approximately above the inner end of the recess 14) may be varied to effect the desired result.

Preferably, the stop member 12 is also utilized as a cutting knife and fastened to the bar $e$ by the same screws 11 which hold knife 10. Thus, a duplex cutting knife, having twin cutting edges which may successively be brought into play, is provided and the manner in which the second cutting edge is brought into play is clearly shown in Fig. 5. The cutting edges of the two knives may be ground in various ways as desired, for example, as shown in Figs. 3 or 4, the latter being generally preferable.

For convenience and to insure that the two blades are mounted on bar $e$ in the desired relation to each other, the knives are pivotally connected together, as indicated at 16 in Fig. 6. The pivotal connection permits one knife to be swung relatively to the other into a position, such as is shown in Fig. 6, to facilitate grinding or for other purposes.

It is also to be noted that the blades of the twin knife described are interchangeable and that either one or the other may be made to cooperate with the spirally revolving blades, as desired.

The general operation of the mower is too well-known to require detailed description and it will suffice to state that the spiral blades $e$ wipe the blades of grass against the cutting edge of knife 10, whereby they are sheared off. The knife 10, however, does not need to be set with anything like the precision ordinarily employed for, as above set forth, it can flex when required. The advantages of the flexible knife are well understood and the use of the flexible blade, broadly, is not novel but the present invention is characterized by permitting flexibility up to a certain point after which the flexible knife abuts a stop and becomes substantially rigid. Therefore, when cutting heavy or tough grass, the knife 10 is not allowed to yield to such an extent as to prevent the shearing of such grass. Thus, the present invention is intended to render commercially satisfactory a form of knife which, although heretofore proposed and having a marked advantage, has not been successful as a practical matter because of a serious disadvantage which is overcome by this invention.

The invention has been disclosed herein, in an embodiment at present preferred for illustrative purposes, but the scope of the invention is defined by the appended claims rather than by the foregoing description.

What I claim is,—

1. The combination in a lawn mower, having revoluble spiral blades, of a knife stationarily mounted for cooperation with said blades and having sufficient flexibility to yield away from the blades when engaged therewith, and means underlying said knife for limiting the extent of said yielding movement.

2. The combination in a lawn mower, having revoluble spiral blades, of a flexible knife stationarily mounted for cooperation with said blades, and an abutment spaced from and below said knife against which abutment said knife may be forced when flexed to limit the degree of the flexing movement.

3. In a lawn mower, side plates, revoluble spiral blades mounted therein, a bar mounted in said plates and relatively stationary with respect to said blades, a flexible knife carried by said bar, a stop member in the nature of a second knife secured to said bar and arranged below the first knife, and spacing means between said knives.

4. In a lawn mower, side plates, revoluble spiral blades mounted therein, a bar mounted in said plates and relatively stationary with respect to said blades, a knife carried by said bar and extending therefrom into cooperative relation with said blades, and a stop member in the nature of a second knife similarly mounted and arranged below the first knife, one of the contiguous faces of said knives having a longitudinally disposed recess therein to separate their adjacent portions.

5. A knife for a lawn mower, comprising, two blades pivoted together near one end and adapted to be secured together in superposed relation along their rear edges and provided with means between the superposed blades for creating a space between the forward and overlying edges of the blades.

6. In a lawn mower, cooperating stationary and revoluble blades, one of said blades comprising, a knife of sufficient flexibility to yield when engaged by the other, and means disposed in the path of flexure of the yieldable knife for limiting the degree of said yielding movement.

In testimony whereof I have affixed my signature.

ADELBERT B. CASE.